(12) United States Patent
Mellerup et al.

(10) Patent No.: US 7,288,278 B2
(45) Date of Patent: Oct. 30, 2007

(54) PROCESS FOR PREPARING VEGETABLE OIL FRACTIONS RICH IN NON-TOCOLIC, HIGH-MELTING, UNSAPONIFIABLE MATTER

(75) Inventors: Jens Mellerup, Tilst (DK); Mogens Bach, Galten (DK); Jorgen Valentin Enkelund, Brabrand (DK)

(73) Assignee: Aarhuskarlshamn Denmark A/S, Aarhus (DK)

( * ) Notice: Subject to any disclaimer, the term of this patent is extended or adjusted under 35 U.S.C. 154(b) by 469 days.

(21) Appl. No.: 10/451,457

(22) PCT Filed: Dec. 20, 2001

(86) PCT No.: PCT/DK01/00849

§ 371 (c)(1),
(2), (4) Date: Oct. 9, 2003

(87) PCT Pub. No.: WO02/50221

PCT Pub. Date: Jun. 27, 2002

(65) Prior Publication Data

US 2004/0047970 A1    Mar. 11, 2004

(30) Foreign Application Priority Data

Dec. 21, 2000  (DK) ............................... 2000 01917

(51) Int. Cl.
*A23D 9/00* (2006.01)
*C11B 7/00* (2006.01)

(52) U.S. Cl. .................... 426/606; 426/2; 426/601; 424/439; 514/141; 514/211

(58) Field of Classification Search ............... None
See application file for complete search history.

(56) References Cited

U.S. PATENT DOCUMENTS 5,679,393 A * 10/1997 Laur et al. ................ 426/417

FOREIGN PATENT DOCUMENTS

EP    0 690 904    6/1997

OTHER PUBLICATIONS

Swern, D, ed. 1979. Bailey's Industrial Oil and Fat Products, vol. 1, 4th edition. John Wiley & Sons, New York, p. 192-196. 323, 328.*
Firestone, ed. 1999. Physical and Chemical Characteristics of Oils, Fats and Waxes. AOCS Press, Champaign, III, p. 92.*
Turpin, P.E., "The Fractionation of Shea Nut Oil . . . ", Fat Sci. Tech., 92, Nr. 5, 1990, pp. 179-184.

* cited by examiner

*Primary Examiner*—Carolyn Paden
(74) *Attorney, Agent, or Firm*—Michael L. Dunn

(57) ABSTRACT

A vegetable oil fraction rich in non-tocolic, high-melting, unsaponifiable matter is prepared by the following steps: A vegetable oil having a slip melting point of not more thatn 30° C. and a content of unsaponifiable matter of at least 0.5% by weight is hydrogenated to fully saturate the fatty acids of the glycerides and to reach a slip melting point of at least 57° C. To the hydrogenated oil is added from 1 to 75% by weight of the unhydrogenated starting oil or another oil having a slip melting point of not more than 30° C. in order to act as a carrier and vehicle for the unsaponifiable matter. Then, a solvent is added to the oil mixture in a ratio between oil and solvent from 1:2 to 1:20, and the mixture is heated to transparency. The oil/-solvent-mixture is cooled in one or more steps to a final temperature in the range from −35 to +30° C., and the precipitated high-melting fraction(s) is (are) filtered off. The filtrate is desolventised, leaving a fraction rich in unsaponifiable matter. By this process very high concentrations of in particular the non-tocolic, higher melting unsaponifiables can be achieved, and the composition of the glyceridic part of the enriched fraction can betailored to specific applications. Also, a novel blood cholesterol-lowering effect of the unsaponifiable constituents from shea butter has been found.

46 Claims, No Drawings

PROCESS FOR PREPARING VEGETABLE OIL FRACTIONS RICH IN NON-TOCOLIC, HIGH-MELTING, UNSAPONIFIABLE MATTER

The present invention refers to a new process for the fractionation of vegetable oils and fats which gives a fraction highly enriched in non-tocolic, high-melting, unsaponifiable matter. Basically the process does not generate trans-fatty acids. The oil fractions can be tailored to specific applications as claimed.

BACKGROUND

Vegetable oils and fats are mainly triglycerides and other saponifiable matter such as mono and diglycerides and traces of free fatty acids. Besides these substances they have a varying content and composition of unsaponifiable constituents.

The unsaponifiable matter (or unsaponifiables) is the material which can be extracted by petroleum ether or other similar solvent after alkaline hydrolysis of a sample. The unsaponifiable constituents and the relative composition are typical for the individual oil. A large number are biologically active components, and the following listing is not exhaustive, but it reflects their importance when it comes to documented functionality, as well as their main sources:

1. Tocols

The constituents are tocopherols and tocotrienols.

Tocopherols are present in practically all vegetable oils. Soybean, corn, sunflower and rapeseed oils are the main commercial sources. Tocotrienols are mainly present in palm, rice bran, barley and wheat germ oil. Commercial quantities of tocotrienols are sourced from palm and rice bran oil.

Tocopherols are nature's major lipid-soluble antioxidant and are often referred to as natural vitamin E (d-α-tocopherol has the highest biopotency, and its activity is the standard against which all the others are compared). Vitamin E is an in vivo antioxidant protecting cell membranes against the damaging effects of free radicals. The application as a supplement and an additive in food and feed is well established. The vast data available also point to its importance in formulating functional cosmetics.

Tocotrienols are related to tocopherols and are considered to be powerful antioxidants. Some studies suggest that the antioxidant potential is even greater than that of the tocopherols. Topical application of tocotrienols has also been found helpful in fighting oxidative damage to the skin while preserving the existing vitamin E in skin cells.

2. Phytosterols

The major constituents are β-sitosterol, campesterol and stigmasterol. Normally they account for more than 70% relative of the sterol fraction. Minor, normally occurring sterols are: stigmastenol, avenasterols and cholesterol.

Sterols are present in almost all vegetable oils. Commercial quantities are mainly sourced from soybean oil. Selection criteria are availability, total content and composition. As an example, rapeseed oil would be a good choice if brassicasterol was wanted as a constituent.

Topical application of a preparation that contains phytosterols results in an increase in both moisture in the skin and lipid content on the skin. The phytosterols adhering to the surface of the skin impart a hydrophobic surface, which is not reversed after exposure to water and soap. There are several studies reported in literature on the beneficial effect of sterols in restoring skin irritation which originates from external sources, i.e. UV-radiation, detergents, wet nappy exposure, etc.

Nutritional compositions containing phytosterols, mainly β-sitosterol and stannol esters, are reported to have a cholesterol-lowering action. The mechanism is not fully understood, but the plant sterols appear to inhibit the uptake of cholesterol from the gut. The effect is that both total and LDL cholesterol level in the blood are reduced.

Sterols are furthermore useful in the pharmaceutical industry for conversion into steroid derivatives.

3. Triterpene Alcohols (TTPA)

The major constituents are α- and β-amyrin, butyrospermol and lupeol. They are mainly present in the form of cinnamic, acetic and fatty acid esters.

The main source is shea butter, but TTPAs are also present in illipe, sal and shorea butter.

For centuries, shea butter has been used traditionally on the African continent for its outstanding properties in protecting and restoring the skin. This is especially attributed to the unsaponifiable matter. A number of tests on human volunteers have proven a series of effects on various kinds of skin problems: cicatrising action in treatment of chapping, restoring dermatitis and erythema from sunburn, etc. In animal tests the butyrospermol fraction is reported to have a cortisone-like action on oral and parenteral administration.

4. γ-Oryzanol

γ-Oryzanol is generally assigned to ferulic acid esters of steroid moieties. The main steroids are β-sitosterol, campesterol, cycloartenol and 24-methylcycloartenol.

γ-oryzanol is found in rice germ and rice bran oil. It is reported to have growth-accelerating effect on animals. Topical application of an ointment which contains γ-oryzanol stimulates the blood flow in the peripheral veins. In tests on human volunteers it is reported to have a cholesterol-lowering effect on both total and LDL cholesterol level.

5. Carotenoids

Carotenoids are mainly present in palm oil. The oil of *Elaeis oleifera* has the highest content of mixed natural carotenoids.

The major constituents are α- and β-carotene.

β-carotene is providing vitamin A activity. It is reported to possess anti-cancer properties for certain types of cancer, but in some investigations α-carotene is found to be more potent. It is also worth noting that other carotenoids present in palm oil, phytolene and especially lycopene, have been reported to possess even better anticancer properties.

The mixed natural carotenoids can furthermore be used as a natural colouring agent in various applications.

Besides the classes of unsaponifiables listed above, there are many other types of interest where the sourcing has to be evaluated according to the relative presence and total concentration in the oil. This is illustrated by the following examples: Olive oil has an interesting content of the triterpene polyunsaturated aliphatic hydrocarbon, squalene. In avocado oil approx. 50% of the unsaponifiable matter consists of alkylfuranes. Sesame seed oil contains sesamolin and sesamin.

All in all, this clearly demonstrates the need for industrial processes tailored to enrich and standardise these valuable substances making it possible to direct and dose them in a proper manner for the application in question.

STATE OF THE ART

In general the concentration of unsaponifiable matter is low in the raw material. Consequently, industrial fatty residues, normally considered as waste, are in use as starting material. An example of this is the production of phytosterols (mainly sitosterols) based on wood-derived by-products.

By the processing of vegetable oils and fats huge quantities of waste are generated i.e. soap stock by the alkaline refining method and deodoriser distillate. Deodoriser distillate is of particular interest as it contains 10–30% unsaponifiable matter of which approximately half is tocopherols and sterols. The separation and purification of the tocopherols and sterols is a complex and expensive process involving physical and chemical methods. The commercial products available are based mainly on deodoriser distillate from soybean oil.

Vegetable oils are used as the starting material in a process that involves either saponification of the oil or conversion of the glycerides into fatty acid methyl esters followed by extraction and purification of the unsaponifiable matter. The commercial products are tocopherol/tocotrienol mixtures and natural mixed carotenoids based on rice bran or palm oil.

The processes described so far are in use on an industrial scale. The following processes are directly applicable to oils and fats and mainly related to sheanut oil as the starting material. Sheanut oil unsaponifiables have interesting, documented dermatological properties, and the oil has a beneficial high non-glyceride content of approx. 6%.

In WO 96/03137 it is illustrated that a sheanut oil fraction with 10% unsaponifiable matter can be enriched to 50% by short-path distillation.

By applying supercritical $CO_2$ extraction on sheanut oil it is experimentally demonstrated that a selective fractionation of the constituents is possible at temperatures of 40–80° C. and pressures of 100–400 bar (Turpin et al. 1990. *Fat Sci. Technol.* 92 (5), 179–184).

Another method for the production of lipid fractions enriched in unsaponifiables is by fractional crystallisation from solvents.

It is experimentally demonstrated that tocopherol concentrates can be obtained from vegetable oils by almost completely removing the glycerides and sterols by fractional crystallisation from solvents at low temperatures. As an example, partially hydrogenated cottonseed oil yielded a concentrate containing 32.1% tocopherols by crystallisation of the oil from 8 times its own weight of acetone at −74° C. Acetone proved to be the most suitable solvent (Singleton and Bailey 1944. *Oil & Soap* 21, 224–226).

EP 0690904 teaches how to prepare two fractions rich in unsaponifiable matter from shea butter. The fat is treated with a polar solvent of the ketone type in order to recover one fraction insoluble in the hot ketone solvent (polyisoprenic hydrocarbons). The hot ketone solvent is cooled to a temperature below 0° C. to crystallise the hot soluble material, which is filtered off. The filtrate is desolventised giving a second fraction rich in unsaponifiable matter (sterols and TTPA-esters). The preferred solvent is acetone. The two fractions are mixed at least in part or preferably in total to give a mixture claimed to contain 18–50% by weight of the unsaponifiable matter especially useful in dermatological compositions.

WO 99/63031 teaches how to fractionate a vegetable oil which gives one or more solid fractions suitable for confectionery applications as well as a liquid fraction enriched in unsaponifiable matter. The oil to be fractionated must have a slip melting point of 32–55° C. and, if necessary, the oil is partly hydrogenated to reach said melting interval. In the description page 9, line 2 from the bottom, it is stated that if the slip melting point of the oil is more than 55° C., the amount of liquid to solubilise the desired components will be too small and they will be precipitating together with the solid triglycerides, and further, that the recovery of the small amount of the liquid fraction will also be more difficult than if a lower slip melting point is used. The fat is mixed with a solvent (acetone is preferred) and heated to transparency and cooled to precipitate a solid fraction. The filtrate is desolventised to give a liquid fraction in which the unsaponifiable matter is enriched. The process is exemplified in a rapeseed fraction claimed to contain 1.5–5% unsaponifiable components, useful as an ingredient in cosmetic and pharmaceutical preparations for providing moisturising, UV-protecting and antiinflammatory properties. The process is further exemplified in a shea butter fraction claimed to contain 15–36% unsaponifiable components, useful as an ingredient in cosmetic and pharmaceutical preparations for providing UV-protection and skin moisturising properties.

To summarise the following can be stated:

The use of waste material, especially the deodoriser distillate, has proven that it is possible to produce tocopherols and phytosterols of high purity. The process is complex and expensive but driven by the high prices of tocopherols. The main problem is the sourcing of the starting material, as vegetable oil production is scattered.

The extraction and purification via the methylester or saponification route is expensive and leaves high amounts of cheap by-products i.e. fatty acids, glycerine and methyl esters. The commercial products have a content of 30–50% unsaponifiable matter.

The direct processing from oils and fats by short-path distillation and supercritical fluid extraction is at present on an experimental stage.

The use of dry or solvent fractional crystallisation has limitations. If the concentration of unsaponifiable matter is low in the oil, the resulting enrichment is also low. Furthermore, if the starting material is liquid, it has to be partly hydrogenated before fractionation. The trans-fatty acids formed during partial hydrogenation of the unsaturated fatty acids in the glycerides may increase the blood cholesterol level and the risk of coronary heart disease if eaten. This makes the enriched fractions unsuited for the fortification of food and as a nutritional supplement or a pharmaceutical or pharma-like product for oral administration.

OBJECT OF THE INVENTION

The invention aims at providing a process for preparing oil fractions highly enriched in non-tocolic unsaponifiable matter by which the enrichment of the higher melting unsaponifiables (e.g. phytosterols, triterpene alcohols and esters, γ-oryzanol, carotenoids, etc.) and the composition of the glyceridic part of the oil fraction can be tailored to the specific application. Basically the process should not generate trans-fatty acids.

SUMMARY OF THE INVENTION

This is achieved by the process of the invention which comprises the following steps:

a) a vegetable oil, or a fraction thereof, having a slip melting point of not more than 30° C. and a content of unsaponifiable matter of at least 0.5% by weight is hydrogenated to fully saturate the fatty acids of the glycerides and to reach a slip melting point of at least 57° C.;

b) to the hydrogenated oil is added from 1 to 75% by weight of the unhydrogenated starting oil or another oil having a slip melting point of max. 30° C. to act as a carrier and vehicle for the unsaponifiable matter;

c) to the oil mixture from b) is added a solvent in a ratio from 1:2 to 1:20, and the mixture is heated to transparency;

d) the mixture from c) is cooled in one or more steps to a final temperature in the range from −35 to +30° C., and the precipitated high-melting fraction(s) is (are) filtered off;

e) the filtrate obtained from d) is desolventised, leaving a fraction rich in unsaponifiable matter.

By the hydrogenation in step a) besides the unsaturated fatty acid moieties also some of the unsaponifiables containing double bonds are converted to the corresponding hydrogenated forms; especially in triterpene alcohols double bonds in side chains will be hydrogenated.

Often it is desirable to conduct step b) by adding from 1 to 75% by weight, preferably from 2 to 50% by weight, and more preferably from 5 to 25% by weight, of the unhydrogenated starting oil as a carrier to the hydrogenated oil from step a). This makes it possible to adjust the content of unsaponifiable matter in the resulting enriched fraction and, at the same time, to keep the transfatty acid content of the enriched fraction at maximum 2%.

Another way of conducting step b) is by adding from 1 to 75% by weight, preferably from 2 to 50% by weight, and more preferably from 5 to 25% by weight, of a triglyceride oil different from the unhydrogenated starting oil as a carrier to the hydrogenated oil from step a), said triglyceride oil predominantly consisting of triglycerides of saturated and unsaturated C8–C22 fatty acids, and preferably being a vegetable oil predominantly consisting of triglycerides of saturated and unsaturated C16–C22 fatty acids. Hereby, it is possible to select a carrier oil having specific beneficial effects in combination with the unsaponifiable matter for the intended use.

Further, it may be desirable that the starting oil containing the unsaponifiable matter is interesterified before the hydrogenation step and/or that the resulting oil mixture is interesterified before the fractionation steps c) and d).

Normally, the solvent used in the fractionation steps c) and d) is of a non-polar or semi-polar type, e.g. selected from the group consisting of hydrocarbons and linear and branched alkanols of 1–5 carbon atoms; and it is preferably hexane or petroleum ether.

Suitably, the starting vegetable oil containing the unsaponifiable matter originates from one of the following or their hybrids: rapeseed, canola, soybean, corn, maizegerm, sunflower, flax (low-linolenic linseed), mango, avocado, olive, sesame, rice bran, wheat germ, oat and oat bran, palm, sal, shorea, illipe and shea, as well as any fraction or mixture thereof.

A starting oil of particular interest is a dekaritenised, lower-melting fraction of shea butter enriched in unsaponifiable matter, which is obtained as follows:

The crude shea butter is deacidified and subsequently partly dekaritenised by mixing it with a semi-polar solvent to precipitate the major part of the polyisoprenic hydrocarbons (karitene) which are disposed of; the solvent is distilled off and the oil is mixed with a suitable solvent e.g. hexane (ratio approx. 1:2 to 1:4), heated to transparency, and cooled to a temperature at which the high-melting glycerides precipitate; the precipitated fraction is filtered off and the filtrate desolventised leaving a lower-melting fraction with a slip melting point of max. 30° C. suitable for further processing.

Generally, the vegetable oil fraction enriched in unsaponifiable matter obtained by the process of the invention may be subjected to further concentration by means of supercritic carbondioxide, molecular distillation, chromatography or recrystallisation and/or to chemical modification such as hydrogenation, ethoxylation, esterification or interesterification without leaving the inventive concept. Also, the physical state of the vegetable oil fraction obtained may further be changed e.g. by emulsification, admixing with a high-melting fat and spray cooling, encapsulation or incorporation in liposomes or nanosomes.

The present invention also concerns a vegetable oil fraction obtainable by the process according to the invention, said fraction being enriched in non-tocolic, high-melting, unsaponifiable matter by a factor of at least 3 and having a trans-fatty acid content of maximum 2% by weight.

In such vegetable oil fraction the unsaponifiable matter is predominantly comprised of or derived from:
  carotenoids;
  sesamin and sesamolin;
  γ-oryzanol;
  sterols, methyl sterols and dimethyl sterols;
  triterpene alcohols and their esters with cinnamic acid, acetic acid and fatty acids.

A particular enriched fraction of shea butter obtainable by the process according to the invention has a content of at least 30% by weight of non-tocolic, high-melting, unsaponifiable matter and is further characterised by containing hydrogenated triterpene alcohols and/or their esters and by having a trans-fatty acid content of maximum 2% by weight. Preferably, such shea butter fraction has a content of 40–90% by weight of unsaponifiable matter. Further, it may be desirable that the preparation of such shea butter fraction has involved at least one interesterification step before the fractionation steps c) and d).

The present invention further comprises the use of a vegetable oil fraction according to the invention for the fortification of food products.

Thus, the invention comprises the use of a vegetable oil fraction according to the invention as a constituent of a dairy or dairy-like food product selected from the group consisting of milk, cream, ice cream, butter, cheese (including soft, cream and processed cheeses), yoghurt and other fermented milk products.

It also comprises the use of a vegetable oil fraction according to the invention as a constituent of a food product selected from the group consisting of margarines, butters and blends, spreads, mayonnaise, shortenings, dressings and salad oils at a concentration of 2–50% by weight.

Further, the invention comprises the use of a vegetable oil fraction according to the invention as an ingredient in cosmetics, pharmaceuticals or pharma-like products for topical application or as an ingredient in nutritional supplements, pharmaceuticals or pharma-like products for oral administration.

In particular, the invention comprises the use of a vegetable oil fraction according to the invention as an ingredient in a nutritional supplement, a pharmaceutical or a pharma-like product for oral administration to humans and other mammals with the purpose of lowering the blood cholesterol level. Specifically, it may be used as an additive to fat-containing food products or as an additive to oils and speciality fats to be incorporated in food products for humans and other mammals with the purpose of lowering the blood cholesterol level.

Finally, the invention comprises the use of a vegetable oil fraction according to the invention for the manufacture of a medicament for lowering the blood cholesterol level.

DETAILED DESCRIPTION OF THE INVENTION

The starting oil is obtained by means of standard crushing, pressing and extraction techniques, optionally followed by acid water treatment, deacidification and bleaching steps normally used in the processing of vegetable oils. If the starting oil has a slip melting point higher than 30° C. the oil is dry or solvent fractionated to obtain a lower melting fraction suitable as a starting oil for the process. The starting oil can also be a mixture of oils or fractions of oils obtained from different sources of raw materials. The prerequisite is that the starting oil has a slip melting point of not more than 30° C. and an unsaponifiable content of at least 0.5% by weight.

I. In a first aspect the present invention relates to a process for preparing an oil fraction rich in non-tocolic, high-melting, unsaponifiable matter which comprises the following steps:
  a) the starting oil is hydrogenated to fully saturate the fatty acids of the glycerides and to reach a slip melting point of at least 57° C.;
  b) to the hydrogenated oil from a) is added a suitable amount of the starting oil to act as a carrier and vehicle for the unsaponifiable matter. The concentration of the carrier oil in the oil mixture is 1–75% by weight, preferably 2–50% by weight, and more preferably 5–25% by weight;
  c) to the oil mixture from b) is added a solvent in a ratio from 1:2 to 1:20, preferably from 1:3 to 1:15, and the mixture is heated to transparency;
  d) the mixture from c) is cooled in one or more steps to a final temperature in the range from −35 to +30° C., preferably from −20 to +20° C., and the precipitated high melting fraction(s) is (are) filtered off;
  e) the filtrate obtained from d) is desolventised, leaving a fraction enriched in unsaponifiable matter.

Suitable conditions for the hydrogenation under a) are illustrated in the examples, but other variations are possible and within the ability of a person skilled in the art of processing vegetable oils.

The amount of starting oil to be added in step b) is dependent upon the original content of unsaponifiable matter in the starting oil and the type of unsaponifiable matter as well as the final concentration of unsaponifiable matter needed for the application in question. The concentration in the enriched fraction and its melting behaviour is regulated by varying the mixture ratio of carrier oil to the hydrogenated oil. This is further illustrated in the examples.

The solvent used in c) is of a non-polar or semi-polar type such as hydrocarbons and linear and branched alkanols of 1–5 carbon atoms. A preferred solvent in the process is hexane or petroleum ether.

In the fractionation step of d) one would expect the higher melting unsaponifiables to be entrapped and co-precipitated with the high melting glycerides, especially if the amount of liquid carrier oil in the oil mixture is low. Quite unexpectedly the major part of the total mass of high-melting unsaponifiables is recovered.

The oil fraction prepared by this first aspect of the invention is characterised by having a trans-fatty acid content of maximum 2% by weight.

The enriched fraction can be further purified by deacidification, bleaching and deodorisation in the normal manner. During deodorisation a part of the tocopherols etc. are stripped off and, therefore, antioxidants and other stabilisers may optionally be added to the product. If the product is liquid or semi-liquid, addition of a structuring fat or wax is useful in order to prevent sudden precipitation of supersaturated unsaponifiables in the product.

II. In a second aspect the present invention relates to a process as detailed under heading I, except that the carrier oil added to the fully hydrogenated starting oil in step b) is different from the starting oil.

The carrier oil used in this aspect is selected to incorporate beneficial effects in combination with the unsaponifiable matter for the intended use, e.g. nutritional aspects such as the degree and type of unsaturation of the fatty acid residues of the oil, and oxidative resistance, etc. The selected carrier oil predominantly consists of triglycerides of saturated and unsaturated C8–C22 fatty acids, and has a slip melting point of not more than 30° C. Preferably the selected carrier oil is a vegetable oil predominantly consisting of triglycerides of saturated and unsaturated C16–C22 fatty acids.

If the selected carrier oil is obtained from unhydrogenated material, then the resulting enriched oil fraction will have a trans-fatty acid content of maximum 2% by weight. If the carrier oil is the liquid fraction of a partly hydrogenated oil, the resulting enriched oil fraction may have a trans-fatty acid content exceeding 2% by weight.

The magnitude of enrichment and the total content of unsaponifiable matter obtainable by the procedures under I and II are illustrated in the examples and summarised in the following table.

| Subject | Example 1 Rapeseed | Example 2 Rapeseed | Example 3 Shea Butter | Example 3 Shea Butter |
|---|---|---|---|---|
| Unsaponifiable content in starting oil, in % | 0.9 | 0.9 | 12.5 | 12.5 |
| Carrier oil content in the mixture, in % | 2 | 5 | 10 | 20 |
| Yield of the enriched fraction, in % | 5.9 | 8.2 | 21.0 | 29.0 |
| Unsaponifiable content in enriched fraction, in % | 14.5 | 10.9 | 53.0 | 38.1 |
| Enrichment factor | 16.1 | 12.1 | 4.2 | 3.0 |
| Recovery of unsaponifiable matter, in % | 94.4 | 98.4 | 89.0 | 88.4 |

III. In a third aspect the invention relates to a process as detailed under headings I or II, wherein the starting oil containing the unsaponifiable matter is interesterified before the hydrogenation step a) and/or the oil mixture from step b) is interesterified before the fractionation steps.

The interesterification of the starting oil increases the oil solubility of a part of the unsaponifiables, and the interesterification of the oil mixture randomises the fatty acid content and thus incorporates unsaturated fatty acids in the glyceridic part of the resulting enriched oil fraction.

The interesterification is performed in the presence of a suitable catalyst, e.g. methoxide, ethoxide, or a mixture of glycerol and caustic lye, as illustrated in the examples, but other variations are possible and within the ability of a person skilled in the art of processing vegetable oils.

As mentioned in the beginning, any vegetable oil or fraction thereof is suited to be processed according to the invention provided that it has a slip melting point of not more than 30° C. and an unsaponifiable content of at least 0.5% by weight. Preferred starting oils for the process originate from the following or their hybrids: rapeseed and canola (*Brassica napus, campestris* etc.), soybean (*Glycine max*), corn (*maize*) germ (*Zea mays*), sunflower (*Helianthus annuus*), flax (*Lineum usitatissimus*), mango (*Mangifera indica*), avocado (*Persea americana*), olive (*Olea europea*), sesame (*Sesamum indicum*), rice-bran (*Oryza sativa*), wheat germ (*Triticum aestivum*), oat and oat bran (*Avena sativa*), palm (*Elaeis guineensis, oleifera* etc.), sal (*Shorea robusta*), illipe (*Madhuca* spp.), shorea (*Shorea stenoptera*), sheanut (*Butyrospermum parkii*) or fractions or mixtures thereof.

Sheanut oil (shea butter) is of particular interest due the nature of the unsaponifiable constituents and a total content of approx. 6% thereof in the shea butter. As the slip melting point of shea butter is normally higher than 30° C., a liquid fraction has to be used as the starting oil. The liquid fraction of shea butter is a result of the production of the high melting fraction known in the industry under the INN-designation "Shea Stearine". The preferred liquid fraction has a further benefit as it has a content of 8% unsaponifiables or higher.

A more preferred fraction is obtained by the fractionation of a partly dekaritenised shea butter. This fraction is especially suitable, as the polyisoprenic hydrocarbons (karitene) are unwanted in edible products. Furthermore, as the karitene is highly unsaturated it thereby gives rise to problems associated with oxidation. The following is an illustration of the typical relative composition of the main types of unsaponifiables in shea butter and the liquid fractions:

| Types of unsaponifiable | Shea butter | Liquid fraction of shea butter | Liquid fraction of dekaritenised sh a butter |
|---|---|---|---|
| TTPAs and esters | 65% | 70% | 85% |
| Phytosterols and others | 6% | 6% | 8% |
| Karitene | 29% | 24% | 7% |

On the basis of the liquid fractions of shea butter the invented process makes it possible to manufacture enriched fractions with an unsaponifiable content in the range 30–90% by the fractionation of oil mixtures containing up to 50% by weight of the unhydrogenated shea butter fraction, that acts as the carrier oil for the unsaponifiable matter. Fractionation of an oil mixture containing up to 75% by weight of the unhydrogenated shea butter fraction will result in an enriched fraction with an unsaponifiable content of 20% by weight which corresponds to an enrichment factor of at least 3 vs. the normal content in shea butter.

Possible Uses of the Enriched Fractions Obtained by the Process

Some of the obvious applications are already illustrated in the section BACKGROUND above.

Due to the high concentrations of unsaponifiables obtainable by the process of the invention the enriched fractions can be used as a starting material for further mechanical and/or chemical processing.

Some new and special applications are related to fractions made on the basis of sheanut oil.

It is known from published studies (Weststrate and Meijer 1998. *Eur. J. Clin. Nutr.* 52 (5):334–343; Sierksma, Weststrate and Meijer 1999. *Brit. J. Nutr.* 82:273–282; Vissers, Zock, Meijer and Katan 2000. *Am. J. Clin. Nutr.* 72:1510–1515) that the naturally occurring unsaponifiable matter in sheanut oil is not suited for lowering cholesterol levels in serum. Surprisingly it has been found that shea butter fractions made according to the process of the present invention are able to reduce the total and LDL cholesterol level in the human blood. The results are detailed in Example 9.

As a result of this, a fraction of shea butter manufactured according to the invention can be used in food products and nutritional supplements, and due to the high concentrations obtainable by the process it can be used as an active ingredient in capsules and tablets for oral administration for the purposes illustrated in Example 9.

The invention will be better understood with reference to the following examples that are illustrative and should not be taken as limiting the scope of the present invention as described in the claims.

EXAMPLES

Methods of Analysis and Definitions

Total unsaponifiable matter (<15%), determined according to DGF C-III Ib

Total unsaponifiable matter (>15%), is determined as 100% minus the total glyceridic content. The glyceridic content is calculated on the basis of the actual content of fatty acids in the sample analysed by absolute quantitative GC according to IUPAC 2.301 and 2.304.

Karitene is determined by methylating the sample with 0.5 n KOH in methanol. The remanence is washed with hot methanol, dissolved in chloroform and the content determined gravimetrically.

TTPA, hydrogenated TTPA and esters thereof are analysed by GC according to a modified IUPAC 2.323 using cholesteryl palmitate as internal standard.

Slip melting point is determined according to AOCS Cc 3-25.

SFC (solid fat content) is analysed by puls-NMR according to IUPAC 2.150.

Fatty acids are analysed by GC according to IUPAC 2.301 and 2.304.

Total content of tocopherols is determined by HPLC with 0.6% pentanol in hexane as mobile phase and with fluorescence detection (extinction 291 nm, emission 330 nm) vs. a reference sample.

Acid value is determined according to IUPAC 2.201.

Iodine value is determined according to IUPAC 2.205.

Enrichment factor is calculated as the fraction: content of unsaponifiables in the enriched fraction divided by the content in the starting oil.

"bdl" denotes: "below detection limit".

"Transparent" means that the liquid is allowing light to pass through so that objects behind can be clearly seen, i.e. more clear than translucent.

Example 1

Fraction of Rapeseed Oil Enriched in Unsaponifiable Content

A semi-refined low-erucic rapeseed oil with an iodine value of 115.7 is fully hydrogenated to an iodine value of 1.3 and a slip melting point of 68.0° C. Rapeseed oil is added to the hydrogenated oil to a content of 2% by weight. The oil mixture is prepared by adding 20 g of rapeseed oil to 980 g of melted hydrogenated oil to reach a total weight of 1000 g.

In a jacketed vessel equipped with a stirrer 10 liter of hexane is added to the oil mixture and the suspension is heated to transparency. From a temperature of approx. 50° C. the mixture is cooled at a rate of approx. 1° C./min to reach a final temperature of 5° C. The precipitated high-melting fraction is filtered off and washed with hexane. The high-melting fraction has an iodine value of 0.5 and a slip melting point of 68.7° C.

The filtrate is desolventised leaving an enriched fraction in a yield of 58.5 g corresponding to 5.9% by weight of the oil mixture.

| Parameter | Starting oil | Enriched fraction |
|---|---|---|
| Total unsaponifiables, % | 0.9 | 14.5 |
| Total tocopherols, ppm | 698 | 5593 |
| Total trans-fatty acids, % | bdl | 1.0 |
| Enrichment factor calc. on total unsaponifiables | | 16.1 |
| Enrichment factor calc. on total tocopherols | | 8.0 |

Based on the analytical figures enrichment factors have been calculated. This clearly demonstrates that by applying this new process of the invention on an oil with a low content of unsaponifiable matter it is possible to produce a highly enriched fraction that at the same time has a low trans-fatty acid content making it suitable for food and non-food applications.

The enrichment factor for total unsaponifiables is much higher than for the low melting tocopherols.

Furthermore, the invented process is recovering the major part of the total unsaponifiable matter. The total mass in the oil mixture is 9 g (0.9% of 1000 g), and the yielded fraction contains 8.5 g (14.5% of 58.5 g) corresponding to a recovery of 94.4% of the total unsaponifiable matter.

Example 2

Oil Enriched with Unsaponifiable Matter Originating from Rapeseed

The procedure in Example 1 was repeated, except that the carrier oil used was a speciality oil with a high oxidative resistance. This oil is commercially available under the trade name "Cremeol PS-6" (Cremeol is a trademark of Aarhus Olie). The oil is produced by multiple dry-fractionation of partly hydrogenated rapeseed, sunflower or soybean oil.

The oil is characterised by the following typical values:

| Saponification value | 186–195 |
|---|---|
| Iodine value | 82–92 |
| Slip melting point, ° C. | 6 |
| Solid fat content at 20° C. % | 0 |
| Rancimat value at 120° C., h | 40 |
| Predicted shelf life at 20° C., years | 5 |
| Fatty acids by GC: | |
| Palmitic, C16:0, % | 4 |
| Stearic, C18:0, % | 4 |
| Total C18:1, % | 84 |
| Linoleic, C18:2, % | 5 |
| Total trans-fatty acids, % | 29 |

The carrier oil "Cremeol PS-6" was added to the fully hydrogenated rapeseed oil in an amount of 5% of the total oil mixture. The fractionation of the oil mixture was performed as described in Example 1.

The results are described in the following table.

| Parameter | Starting Oil | Enriched Fraction |
|---|---|---|
| Total unsaponifiables, % | 0.9 | 10.9 |
| Total Tocopherols, ppm | 698 | 5322 |
| Total trans-fatty acids, % | bdl | 22.8 |
| Enrichment factor calc. on total unsaponifiables | | 12.1 |
| Enrichment factor calc. on total tocopherols | | 7.6 |
| Yield of fraction in g | | 82 |
| Recovered amount of unsaponifiables in g | | 8.9 |
| Recovery in % of total matter | | 98.9 |

The enriched fraction appeared to have a consistency similar to petroleum jelly. The slip melting point was 44.9° C.

This clearly demonstrates that it is possible to enrich a suitable carrier oil with the unsaponifiable matter in question by applying this new process of the invention. Like in Example 1 the enrichment factor for total unsaponifiables is much higher than for the low melting tocopherols.

As can be seen, the process does not generate trans-fatty acids. The content of trans-fatty acids in the fraction is inherent to the preferred carrier oil.

Due to the high oxidative resistance provided by the carrier oil the produced fraction is ideally suited as an ingredient in cosmetics, toiletries and pharma products for dermal application.

Example 3

Fraction of Sheanut Oil Enriched in Unsaponifiable Matter

The starting oil in this example is an industrially produced, semi-refined and partly dekaritenised fraction of shea butter obtained by the following processing steps commonly used in the vegetable oil industry for the production of food ingredients:

1. The crude oil is obtained by means of the standard crushing, pressing and extraction techniques.
2. The free fatty acids are removed in an alkaline deacidification process followed by a bleaching step to reduce the colour.
3. The semi-refined oil is dekaritenised by mixing it with a semi-polar solvent by which the main part of the karitene precipitates, and is subsequently disposed of. The solvent is distilled off leaving a partly dekaritenised shea butter.
4. In the following fractionation process the fat is mixed with hexane and heated to transparency followed by a cooling designed to crystallise the high-melting fraction known under the INN-designation "Shea Stearine".
5. The Shea Stearine is filtered off and the filtrate desolventised leaving a low-melting, partly dekaritenised shea butter fraction. After post refining in the form of an alkaline deacidification and a subsequent treatment with bleaching earth the fraction is named PR 589.

The shea butter fraction PR 589 is characterised by the following typical values vs. shea butter:

| Parameter Butter | Shea fraction PR 589 | Refined Shea |
|---|---|---|
| Slip melting point, ° C. | 20 | 32 |
| Acid value | 0.1 | 0.3 |
| Iodine value | 74 | 62 |
| Total unsaponifiables, % | 12.5 | 6 |
| Polyisoprenic hydrocarbons, % | 0.8 | 2 |

The shea butter fraction was fully hydrogenated to a slip melting point of 68° C. by the following process:

To 2500 g of the fraction was added 0.5% catalyst ("Girdler G-53", Süd-Chemie AG) and the mixture was heated to 180° C. Hydrogen was applied at 5 ato for 160 minutes. The catalyst was filtered off, and the hydrogenated oil was denickled in the normal way. To the hydrogenated oil was added 10% by weight of shea butter fraction PR 589 to produce an oil mixture ready for fractionation. In the same manner another oil mixture was made by adding 20% of shea butter fraction PR 589 to the hydrogenated oil.

In jacketed vessels equipped with stirrer and containing 1000 g each of the two oil mixtures hexane was added in a ratio oil to hexane of 1:10 w/v and the mixture-was heated to transparency. From a temperature of 36° C. the mixture was cooled at a rate of approx. 1° C./min to reach a final temperature of 0° C. The precipitated high-melting fractions are filtered off and the filtrate desolventised leaving two fractions rich in unsaponifiable matter. The two fractions were obtained in a yield of 21.0% and 29.0%, respectively.

The total mass of unsaponifiables in the oil mixture is 125 g (12.5% of 1000 g). As can be seen in the following table the major part is recovered by the process.

| Parameter | Shea fraction PR-589 | Fraction I (10% PR-589) | Fraction II (20% PR-589) |
|---|---|---|---|
| Total unsaponifiables, % | 12.5 | 53.0 | 38.1 |
| Total trans-fatty acids, % | bdl | 0.7 | 0.4 |
| Enrichment factor calc. on total unsaponifiables | | 4.2 | 3.0 |
| Yield of fraction in g | | 210 | 290 |
| Recovered amount of unsaponifiables in g | | 111.3 | 110.5 |
| Recovery in % of total matter | | 89.0 | 88.4 |

The two fractions have a remarkably high content of unsaponifiable matter making them suited for a number of food and non-food applications. Especially in Fraction I the concentration has reached a level that makes it possible to use it in e.g. gelatine capsules for oral administration.

Example 4

Industrial Scale Test-production of a Fraction of Shea Butter Enriched in Unsaponifiable Matter In order to verify the applicability of the process on an industrial scale a fraction similar to Fraction I in Example 3 was produced as described in the following:

Shea butter fraction PR 589 was hydrogenated as described in Example 3. To 30 metric ton of the hydrogenated oil was added 4.5 metric ton of shea butter fraction PR 589.

To the oil mixture containing 13% carrier oil was added hexane in the ratio 1:10 v/v, and the mixture was heated to transparency and fractionated by cooling the mixture to reach a final temperature of 0° C. The precipitated high-melting fraction was filtered off and the filtrate desolventised leaving a fraction rich in unsaponifiable matter in a yield of 23.5% based on the weight of the oil mixture.

The recovered fraction was passed through a 50 μm filter and further purified by deodorisation at 220° C. and 2 mbar. After cooling to 100° C. 25 ppm citric acid and 500 ppm natural mixed tocopherols were added to the product to improve the oxidative resistance.

The final product has the following characteristics:

| | |
|---|---|
| Appearance | Yellowish, homogeneous paste |
| Slip melting point, ° C. | 28.6 |
| Solid fat content at 20° C., % | 10.3 |
| Solid fat content at 30° C., % | 7.1 |
| Solid fat content at 40° C., % | 3.8 |
| Rancimat value, 120° C., h | 31.7 |
| Acid value | 0.84 |
| Iodine value | 80.8 |
| Total unsaponifiable matter, % | 45.7 |

Fatty acid composition of the glyceridic part in %:

| | |
|---|---|
| C12:0 | 0.7 |
| C14:0 | 0.4 |
| C16:0 | 8.0 |
| C18:0 | 33.3 |
| C18:1 cis | 45.9 |
| C18:1 trans | 1.8 |
| C18:2 cis | 7.0 |
| C18:2 trans | 0.1 |
| C18:3 cis | 0.3 |
| C20:0 | 1.3 |
| C20:1 cis | 0.3 |
| C22:0 | 0.2 |
| Others | 0.7 |

The high-melting fraction was of a very good quality which makes it suited as a raw material for the production of food ingredients.

This example demonstrates the applicability of the invented process on an industrial scale.

Example 5

Interesterified Fraction of Shea Butter Enriched in Unsaponifiable Matter

In shea butter the major part of the unsaponifiable matter is α- and β-amyrin, butyrospermol and lupeol, present in the form of cinnamic and acetic acid esters and to a lesser extent as fatty acid esters and the free alcohols. A minor part is the phytosterols i.e. α-spinasterol, stigmasterol, etc.

In order to increase the oil solubility of the unsaponifiables, the starting oil is interesterified before hydrogenation for the purpose of increasing the presence of fatty acid ester types. Shea butter fraction PR 589 is interesterified at a temperature of 120° C. with 0.1% sodium methoxide as a catalyst. The resulting interesterified product is named shea butter fraction PO 135. The relative composition and the total content of the unsaponifiable matter is given below:

| Constituents | PR 589 | PO 135 |
| --- | --- | --- |
| Total unsaponifiable content comprising: | 12.5% | 12.0% |
| TTPA-cinnamic esters | 50% | 48% |
| TTPA-acetic esters | 22% | 21% |
| TTPA-fatty acid esters | 4% | 14% |
| TTPA and Phytosterols | 17% | 9% |
| Karitene | 7% | 8% |

The shea butter fraction PO 135 is fully hydrogenated according to the procedure described in Example 3. An oil mixture is prepared by mixing the fully hydrogenated and the unhydrogenated shea butter fraction PO 135 in the ratio 1:1 by weight.

In order to randomise the glycerides the oil mixture is interesterified at a temperature of 120° C. for 15 minutes with 0.1% sodium methoxide as a catalyst. After treatment with citric acid and bleaching earth the resulting product is named shea butter fraction PO 136.

Shea butter fraction PO 136 is fractionated in two steps by mixing it with hexane in the ratio 1:4 (w/v) and heating the mixture to transparency and cooling it to 0° C. to precipitate the first high-melting fraction and filtering it off. The filtrate is distilled until the oil to hexane ratio is 1:4 (w/v). The second high-melting fraction is disposed of after cooling to −15° C. The filtrate is desolventised leaving a fraction named PO 136EE.

Shea butter fraction PO 136EE has a total unsaponifiable content of 34.0%. The product has the following composition in which "TTPA" comprises hydrogenated moieties:

| | |
| --- | --- |
| Total glycerides | 66.0% |
| TTPA-acetic acid esters | 6.2% |
| TTPA-fatty acid esters | 7.5% |
| TTPA-cinnamic acid esters | 15.7% |
| Karitene | 2.0% |
| Other unsaponifiable matter | 2.6% |

Fatty acid composition of the glyceridic part:

| | |
| --- | --- |
| C14:0 | 0.1% |
| C16:0 | 4.0% |
| C16:1 cis | 0.1% |
| C18:0 | 29.6% |
| C18:1 cis | 54.4% |
| C18:1 trans | 0.6% |
| C18:2 cis | 9.4% |
| C18:2 trans | 0.0% |
| C18:3 cis | 0.3% |
| C20:0 | 0.8% |
| C20:1 cis | 0.5% |
| C22:0 | 0.1% |
| C22:1 cis | 0.1% |

Shea butter fraction PO 136EE is tailored to be used for the nutritional fortification of any food product. Furthermore, it is especially suited to be used as an ingredient in fat-containing nutritional products for the purpose of lowering the blood cholesterol content.

If a higher degree of enrichment is needed for the intended use, this can be achieved by the fractionation of an oil mixture containing less unhydrogenated shea butter fraction PO 135 cf. Example 3.

Example 6

Use of an Oil, Enriched with Unsaponifiable Matter Originating from Rapeseed, in a Cosmetic Formulation From literature (*British Journal of Dermatology* 134, 215–220 (1996)) it is known that unsaponifiables from rapeseed have a beneficial effect in restoring the barrier function on surfactant-irritated skin.

In the following formulation the oil fraction enriched in rapeseed unsaponifiables from Example 2, where 5% "Cremeol PS-6" is added as carrier oil, is incorporated in a hand cream intended to be used after manual cleaning.

| Phase | Ingredient | CTFA/INCI Name | % w/w |
| --- | --- | --- | --- |
| A: | "Cremeol PS-6" enriched in rapeseed unsaponifiables | Vegetable Oil (and) Rapeseed (*Brassica Campestris*) Oil Unsaponifiables | 6.00 |
| | "Cremeol FR-36" | Glyceryl Dioleate | 6.00 |
| | "Tegin SE" (Th Goldschmidt) | Glyceryl Stearate SE | 4.50 |
| | "Cetiol 868" (Cognis) | Octyl Stearate | 2.00 |
| | "Cremeol HF-52" | Hydrogenated Vegetable Oil | 1.00 |
| | "Abil 100" (Th Goldschmidt) | Dimethicone | 0.50 |
| B: | Water, deionized | Water | ad 100.00 |
| | Glycerin, 99.5% | Glycerin | 4.00 |
| C: | Perfume and preservatives | | q.s. |

The product is produced by heating A and B to 75–80° C. while stirring and combining the two phases. The mixture is homogenised at 70° C. Cool slowly to 30° C. while stirring. Add C and homogenise at 30° C. The final viscosity of the emulsion is obtained after 2–3 days at room temperature.

Example 7

Use of a Fraction of Sheanut Oil, Enriched in Unsaponifiable Matter, in Cosmetic and Pharma-like Ointments The use of fraction II in Example 3 in two waterless formulations intended to protect and restore the skin is illustrated in the following way:

I. Lipbalm in Stick Form

| Ingredient | CTFA/INCI Name | % w/w |
| --- | --- | --- |
| Shea fraction II | Shea Butter (*Butyrospermum Parkil*) Extract | 2.00 |
| "Cremeol VP" | Veg. Oil (and) Hydrogenated Veg. Oil (and) Candelilla (*Euphorbia Cerifera*) Wax | 73.40 |
| "Cremeol HF-52" | Hydrogenated Veg. Oil | 13.00 |
| Beeswax | Beeswax | 7.80 |
| Carnauba wax | Carnauba (*Copernicia Cerifera*) Wax | 3.80 |
| Fragrance | | q.s. |

All the ingredients are heated to 70–80° C. and mixed. The mixture is filled into moulds or 5 ml tubes at 65–70° C. and cooled.

The formulation was tested at various concentrations of shea fraction II by five female panelists skilled as daily users of lipbalm. A dosage of 2–3% was preferred in emolliency and incorporating an increase of the lasting effect by one to two hours. At higher concentrations the product was too sticky and declined as being a cosmetic product.

II. Pharma-like Ointment

| Ingredient | % w/w |
|---|---|
| Shea fraction II | 20 |
| White Petrolatum, NF19 | 72 |
| White Wax, NF19 | 3 |
| Isopropyl palmitate | 5 |

All the ingredients are heated to 70–80° C. and mixed. The mixture is cooled while stirring. When the product starts to congeal it is filled into tubes. The ointment has a slip melting point of 47.6° C. and passed a storage test at 40° C.

Due to the restoring, cicatrising and bacteriostatic properties of the sheanut oil unsaponifiable matter the product is intended for use on extremely dry, sensitive skins, wounds and various scars.

Example 8

Use of a Fraction of Sheanut Oil, Enriched in Unsaponifiable Matter, as an Active Ingredient in a Soft Gelatine Capsule for Oral Administration Due to the high content of unsaponifiable matter in fraction I from Example 3 it is suited for encapsulation.

A mixture was made according to the following formulation:

| Ingredient | % w/w |
|---|---|
| Shea fraction I | 80% |
| "Shoguwar 41 NG/NF" (NF 19, hydrogen. veg. oil - Type II) | 20% |

"Shoguwar 41 NG/NF" is a soybean oil hydrogenated to a slip melting point of 41° C. At 20° C. SFC is approx. 75% and at 37° C. SFC is approx. 20%. This makes it a good processing agent and carrier that will keep the active material suspended and uniformly distributed.

The two ingredients are dosed, melted and mixed at 45° C. and fed to the filling machine to produce soft gelatine capsules of 250 mg content.

A daily dose of 750 mg (250 mg three times daily) is equivalent to ca. 300 mg unsaponifiables.

Example 9

A Clinical Study of the Efficacy of an Interesterified Fraction of Sheanut Oil Enriched in Non-Tocolic, High-Melting Unsaponifiable Matter on Plasma Lipids and Lipoproteins in Healthy Subjects with Normal to Borderline High Plasma Cholesterol

| Setting: | Aalborg Sygehus, Hobrovej 18, 9000 Aalborg, Denmark. |
|---|---|
| Project manager: | Erik Berg Schmidt MD, D.M.Sci., Department of Medicine, Hjorring/Bronderslev Hospital, Hjorring, Denmark. |
| Project team: | Inge Aardestrup, Department of Clinical Biochemistry, Aalborg Hospital, Aalborg, Denmark; Jens Mellerup, R&D Department of Aarhus Oliefabrik A/S, Aarhus, Denmark; Jeppe Hagstrup Christensen, Department of Nephrology, Aalborg Hospital, Aalborg, Denmark. |

BACKGROUND

Plasma total cholesterol and low-density lipoprotein (LDL) cholesterol levels are strongly related to the risk of coronary heart disease (CHD), the major cause of premature death in Western societies. Thus, a reduction in total cholesterol of 1% is associated with a 2–3% decrease in the risk of CHD. A reduction of plasma cholesterol levels is therefore of paramount importance both for the individual patients and for the whole community. Intake of plant sterols can lower the plasma cholesterol concentrations in humans. However, little is known about the effects of the unsaponifiable constituents of sheanut oil, mainly the triterpene alcohols.

Objective

To study the effect of a sheanut oil fraction, prepared according to Example 5, on plasma lipids and lipoproteins in healthy subjects with normal to borderline high plasma cholesterol.

Design and Treatment

One hundred and five healthy volunteers (54 men of age 38.8±13.4 y, range 20–64 y, and 51 women of age 40.7 ±12.6 y, range 23–60 y) were randomly assigned to 2 treatment groups in a double-blind study design. The subjects were randomized into treatment blocks of 16 persons in order to secure an equal distribution of men and women in the two groups. The Active group consumed 30 g/d of a sheanut oil spread, and the Control group consumed 30 g/d of a sunflower oil spread. A dietary questionnaire was filled out, and the subjects were asked to maintain their habitual diet during the whole study period. The subjects consumed one unit of spread 3 times a day and usually on a slice of bread, at breakfast, lunch, and supper. The diets were given for 6 consecutive weeks.

The R&D Department, Aarhus Oliefabrik A/S, Denmark, specially prepared the experimental spreads. They were packed in blinded foil envelopes each holding 10 g and labeled with a four-digit code. The fat phase of both spreads contained liquid oil and hard stock. The hard stock and the sunflower oil used in the two spreads came from the same batches. The liquid sheanut oil used, containing 33.2% by weight of non-glyceridic constituents, was modified by fractionation, hydrogenation, and interesterification according to the procedure described in Example 5.

The sheanut oil spread contained 10% non-glycerides, i.e. triterpene acetic acid esters, triterpene cinnamic acid esters, triterpene fatty acid esters, free triterpene alcohols, free sterols, and kariten (a naturally occurring polyisoprenic hydrocarbon in sheanuts). The sunflower oil spread was similar to the range of well-known sunflower oil products with a long history of heart health promotion.

Both spreads showed normal appearance and had almost identical structure. Compositions are shown in Table 1.

TABLE 1

Composition of the experimental spreads.

| | Sunflower | Sheanut |
|---|---|---|
| Body Fat 62 [1](g/100 g) | 19.66[3] | 19.66[3] |
| Solex[2] (g/100 g) | 58.98[4] | 29.17[4] |
| Sheanut oil (g/100 g) | | 29.81 |
| Fat soluble ingredients (g/100 g) | 1.36 | 1.36 |
| Water phase (g/100 g) | 20.00 | 20.00 |
| Saturated fatty acids (wt % in the glycerides): | 25.9 | 34.4 |
| Lauric (C12:0) | 4.0 | 4.6 |
| Myristic (C14:0) | 1.8 | 2.1 |
| Palmitic (C16:0) | 15.6 | 16.3 |
| Stearic (C18:0) | 4.1 | 11.0 |
| Arachidic (C20:0) | 0.4 | 0.4 |
| Monounsaturated fatty acids (wt % in the glycerides): | 22.5 | 31.9 |
| Palmitoleic (C16:1, 9c) | 0.1 | 0.1 |
| Oleic (C18:1, 9c) | 22.2 | 31.6 |
| Gadoleic (C20:1, 9c) | 0.2 | 0.2 |
| Polyunsaturated fatty acids (wt % in the glycerides): | 50.2 | 31.9 |
| Linoleic (C18:2, 9c, 12c) | 49.9 | 31.7 |
| α-Linolenic (C18:3, 9c, 12c, 15c) | 0.3 | 0.2 |
| Trans fatty acids (wt % in the glycerides) | 0.4 | 0.7 |
| Non-glycerides (wt % of the fat phase): | 1.1 | 12.6 |
| Triterpene acetic acid esters | | 2.2 |
| Triterpene cinnamic acid esters | | 5.9 |
| Triterpene fatty acid esters | | 3.5 |
| Free triterpene alcohols and sterols | 0.3 | 0.3 |
| Kariten[5] | | 0.7 |

[1] Body Fat 62 (supplied by Aarhus Oliefabrik A/S) is the trade name of unhydrogenated vegetable hard stock for production of margarines and spreads.
[2] Solex (supplied by Aarhus Oliefabrik A/S) is the trade name of fully refined sunflower seed oil.
[3] From the same batch of Body Fat 62.
[4] From the same batch of Solex.
[5] A naturally occurring polyisoprenic hydrocarbon in sheanuts.

Results

The preparations were well tolerated, and all of the one hundred and five volunteers who started also completed the trial. Fifty-three subjects were allocated to the Active group, and 52 subjects participated in the Control group. Baseline characteristics of the study population are given in Table 2. Pre-experimentally no significant differences in the plasma cholesterol levels existed between the Active group and the Control group.

TABLE 2

Characteristics of the volunteers before inclusion.

| | Men (n = 54) | | Women (n = 51) | |
|---|---|---|---|---|
| | mean ± s.d. | range | mean ± s.d. | range |
| Age (y) | 38.8 ± 13.4 | 20–64 | 40.7 ± 12.6 | 23–60 |
| Total-cholesterol (mmol/L) | 5.04 ± 1.22 | 2.80–8.30 | 5.15 ± 1.01 | 3.45–7.85 |
| HDL-cholesterol (mmol/L) | 1.31 ± 0.25 | 0.80–2.00 | 1.63 ± 0.32[1] | 0.80–2.40 |
| LDL-cholesterol (mmol/L) | 3.18 ± 1.14[2] | 1.35–6.40 | 3.00 ± 0.96 | 1.60–5.75 |

[1] Significantly different from men: $P < 0.001$.
[2] n = 53

There were significant reductions in plasma total- and LDL-cholesterol of 5 and 8%, respectively, after treatment in the Active group.

The mean plasma linoleic acid concentration increased significantly by 6% after the sheanut diet and significantly by 10% after the sunflower diet. The mean serum stearic acid concentration increased significantly by 4% after the sheanut diet and non-significantly by 1% after the sunflower diet. These results are in the directions expected from the fatty acid contents of the diets and validate the participants' compliance to the dietary instructions.

The effect of the diets on plasma lipids and lipoproteins are given in Table 3 and the safety data are given in Table 4.

TABLE 3

Plasma lipid and lipoprotein concentrations and physical data before inclusion and at the end of the six weeks' study period and the effects of the experimental diets.

| | Sunflower diet (n = 52) | | Sheanut diet (n = 53) | | Effect of diets | |
|---|---|---|---|---|---|---|
| | Before | After | Before | After | Sunflower | Sheanut |
| Total-cholesterol, all[a] | 4.97 ± 1.02 | 4.87 ± 1.00[1] | 5.22 ± 1.21 | 4.96 ± 1.08[3] | −0.10 ± 0.32 | −0.25 ± 0.41* |
| Total-cholesterol, men | 4.98 ± 1.10[d] | 4.84 ± 1.06 | 5.10 ± 1.34[e] | 4.85 ± 1.23[2] | −0.13 ± 0.36 | −0.25 ± 0.39 |
| Total-cholesterol, women | 4.96 ± 0.95[d] | 4.90 ± 0.95 | 5.35 ± 1.05[e] | 5.09 ± 0.90[2] | −0.06 ± 0.28 | −0.26 ± 0.44 |
| HDL-cholesterol, all[a] | 1.48 ± 0.36 | 1.52 ± 0.36 | 1.45 ± 0.30 | 1.46 ± 0.32 | 0.04 ± 0.15 | 0.02 ± 0.13 |
| HDL-cholesterol, men | 1.31 ± 0.25[d] | 1.35 ± 0.25 | 1.31 ± 0.26[e] | 1.30 ± 0.26 | 0.04 ± 0.15 | −0.01 ± 0.11 |
| HDL-cholesterol, women | 1.66 ± 0.37[d] | 1.69 ± 0.37 | 1.60 ± 0.28[e] | 1.64 ± 0.29 | 0.03 ± 0.16 | −0.04 ± 0.14 |
| LDL-cholesterol, all[a] | 2.97 ± 0.97[g] | 2.86 ± 0.88[2] | 3.21 ± 1.13 | 2.96 ± 0.97[3] | −0.11 ± 0.29 | −0.25 ± 0.37* |
| LDL-cholesterol, men | 3.15 ± 1.09[e] | 3.00 ± 0.97[1] | 3.21 ± 1.21[e] | 3.00 ± 1.07[2] | −0.15 ± 0.35 | −0.22 ± 0.34 |
| LDL-cholesterol, women | 2.81 ± 0.84[d] | 2.73 ± 0.79 | 3.20 ± 1.05[e] | 2.92 ± 0.86[2] | −0.08 ± 0.22 | −0.28 ± 0.41* |
| Apolipoprotein B (g/L) | 0.92 ± 0.26 | 0.88 ± 0.23[2] | 1.00 ± 0.28 | 0.94 ± 0.23[3] | −0.04 ± 0.08 | −0.07 ± 0.10 |
| Lipoprotein(a) (units/L) | 251.5 ± 338.4[g] | 222.8 ± 288.6[2] | 286.2 ± 358.9[f] | 264.9 ± 342.5 | −28.7 ± 69.3 | −21.4 ± 80.5 |
| Triglycerides in serum[b] | 1.17 ± 0.92 | 1.15 ± 0.95 | 1.23 ± 0.55 | 1.18 ± 0.54 | −0.02 ± 0.24 | −0.05 ± 0.32 |
| LDL:HDL-cholesterol | 2.14 ± 0.94[g] | 2.00 ± 0.80[2] | 2.33 ± 1.08 | 2.13 ± 0.90[3] | −0.14 ± 0.30 | −0.20 ± 0.36 |
| LDL:Apolipoprotein B | 3.19 ± 0.34[g] | 3.21 ± 0.33 | 3.25 ± 0.34 | 3.17 ± 0.36 | 0.02 ± 0.22 | −0.07 ± 0.28 |
| Body Mass Index (kg/m[2]) | 24.78 ± 3.38 | 24.74 ± 3.42 | 25.58 ± 4.37 | 25.43 ± 4.41[2] | −0.05 ± 0.47 | −0.15 ± 0.36 |
| Diastolic BP (mmHg) | 71.3 ± 8.8 | 69.7 ± 7.5 | 72.9 ± 8.0 | 71.2 ± 8.4[2] | −1.5 ± 6.3 | −1.6 ± 4.4 |
| Systolic BP (mmHg) | 116.7 ± 11.7 | 114.4 ± 10.5[1] | 117.8 ± 10.8 | 114.0 ± 11.3[3] | −2.3 ± 7.0 | −3.8 ± 7.1 |

TABLE 3-continued

Plasma lipid and lipoprotein concentrations and physical data before inclusion and at the end of the six weeks' study period and the effects of the experimental diets.

|  | Sunflower diet (n = 52) | | Sheanut diet (n = 53) | | Effect of diets | |
|---|---|---|---|---|---|---|
|  | Before | After | Before | After | Sunflower | Sheanut |
| C18:0 (wt %) | 12.16 ± 1.10 | 12.26 ± 1.27 | 12.01 ± 1.12 | 12.46 ± 1.03³ | 0.09 ± 0.73 | 0.45 ± 0.68* |
| C18:2ω6 (wt %) | 20.82 ± 2.52 | 22.81 ± 2.66³ | 20.62 ± 2.13 | 21.84 ± 2.36³ | 1.99 ± 2.20 | 1.22 ± 1.89 |

¹Significantly different from "Before": $P < 0.05$;
²significantly different from "Before": $P < 0.01$;
³significantly different from "Before": $P < 0.001$.
*Significantly different from "Sunflower": $P < 0.05$.
ᵃIn mmol/L. To convert total-, HDL-, and LDL-cholesterol values to mg/dL multiply by 38.67.
ᵇIn mmol/L. To convert triglyceride values to mg/dL multiply by 88.54.
$^c$n = 25;
$^d$n = 26;
$^e$n = 28;
$^f$n = 49;
$^g$n = 51.

TABLE 4

Safety data before inclusion and at the end of the six weeks' study period and the effects of the experimental diets.

|  | Sunflower diet (n = 52) | | Sheanut diet (n = 53) | | Effect of diets | |
|---|---|---|---|---|---|---|
|  | Before | After | Before | After | Sunflower | Sheanut |
| Sodium (mmol/L) | 144.7 ± 2.1 | 144.4 ± 1.7 | 144.8 ± 1.8 | 144.6 ± 1.8 | −0.3 ± 1.7 | −0.2 ± 1.7 |
| Potassium (mmol/L) | 4.20 ± 0.21 | 4.14 ± 0.25 | 4.20 ± 0.18 | 4.17 ± 0.19 | −0.06 ± 0.24 | −0.03 ± 0.21 |
| Magnesium (mmol/L) | 0.815 ± 0.062 | 0.799 ± 0.055¹ | 0.817 ± 0.056 | 0.802 ± 0.061¹ | −0.015 ± 0.052 | −0.015 ± 0.041 |
| Iron (μmol/L) | 16.37 ± 5.98 | 18.25 ± 6.64 | 18.66 ± 5.96 | 18.49 ± 6.71 | 1.88 ± 7.87 | −0.17 ± 7.70 |
| Calciumᵃ (mmol/L) | 2.468 ± 0.062 | 2.473 ± 0.058 | 2.456 ± 0.048 | 2.465 ± 0.055 | 0.005 ± 0.043 | 0.008 ± 0.050 |
| ASATᵇ (units/L) | 22.00 ± 7.92 | 22.88 ± 9.34 | 21.83 ± 5.57 | 22.17 ± 5.84 | 0.88 ± 9.91 | 0.34 ± 4.56 |
| Bilirubin (μmol/L) | 11.04 ± 3.06 | 11.94 ± 3.99¹ | 11.30 ± 3.46 | 10.89 ± 3.21 | 0.90 ± 3.24 | −0.42 ± 2.58* |
| ALPᶜ (units/L) | 137.8 ± 38.54 | 134.2 ± 38.99 | 131.5 ± 31.01 | 129.9 ± 29.15 | −3.63 ± 14.45 | −1.62 ± 13.63 |
| Vitamine B12 (pmol/L) | 267.4 ± 114.1 | 258.2 ± 121.5 | 232.6 ± 83.3 | 224.0 ± 88.9 | −9.2 ± 45.1 | −8.6 ± 43.6 |
| INRᵈ | 1.05 ± 0.09 | 1.06 ± 0.09 | 1.06 ± 0.09 | 1.05 ± 0.08 | 0.00 ± 0.04 | −0.01 ± 0.05 |
| Haemoglobin (mmol/L) | 8.360 ± 0.665 | 8.371 ± 0.699 | 8.549 ± 0.750 | 8.534 ± 0.699 | 0.012 ± 0.341 | −0.015 ± 0.373 |
| Leucocytes (10⁹/L) | 5.53 ± 1.81 | 5.56 ± 1.54 | 5.59 ± 1.39 | 5.86 ± 1.62¹ | 0.03 ± 1.15 | 0.27 ± 0.98 |
| Trombocytes (10⁹/L) | 236.4 ± 51.80 | 228.5 ± 53.97² | 241.0 ± 54.98 | 237.8 ± 48.16 | −7.88 ± 19.58 | −3.23 ± 25.26 |

¹Significantly different from "Before": $P < 0.05$;
²significantly different from "Before": $P < 0.01$.
*Significantly different from "Sunflower": $P < 0.05$.
ᵃAdjusted for albumin.
bAspartate aminotransferase;
ᶜalkaline phosphatase;
ᵈInternational Normalized Ratio.

CONCLUSION

In summary the study shows that consumption of a sheanut oil spread containing unsaponifiable material, which is a mixture of triterpene alcohols such as butyrospermol, α-amyrin, β-amyrin, lupeol, and germanicol, is effective and safe in lowering plasma total- and LDL-cholesterol levels in healthy adults. The observed reduction in LDL-cholesterol in the present study is of clinical relevance, and in the order of magnitude of what is commonly seen in subjects given dietary advice for hypercholesterolemia. We therefore conclude that intake of this type of sheanut oil can make a contribution to the prevention of CHD.

The invention claimed is:

1. A process for preparing a vegetable oil fraction rich in non-tocolic, high-melting, unsaponifiable matter which comprises the following steps:
   a) hydrogenating a starting vegetable oil having a slip melting point of less than about 30° C. and a content of unsaponifiable matter of at least about 0.5% by weight, to fully saturate fatty acids of glycerides in the oil and to reach a slip melting point of at least about 57° C.;
   b) adding from about 1 to about 75% by weight of an oil having a slip melting point of less than about 30° C. to act as a carrier and vehicle for the unsaponifiable matter;
   c) adding a solvent to the oil mixture from b) in a ratio from 1:2 to 1:20, and heating the resulting mixture to transparency;
   d) cooling the mixture from c) to a final temperature in the range from about −35 to about +30° C., to precipitate high-melting fractions;
   e) filtering the high melting fractions to obtain a liquid filtrate; and
   f) removing solvent from the filtrate to obtain a desolventized fraction rich in unsaponifiable matter.

2. A process according to claim 1, wherein from 2 to 50% by weight of carrier oil is added to the hydrogenated oil in step b).

3. The process of claim 2 wherein the carrier oil is from 5 to 25% by weight.

4. A process according to claim 1, wherein unhydrogenated starting oil is used as the carrier in step b).

5. A process according to claim 1, wherein a triglyceride oil different from the unhydrogenated starting oil is used as the carrier in step b), said triglyceride oil predominantly consisting of triglycerides of saturated and unsaturated C8–C22 fatty acids.

6. A process of claim 5 wherein the different unhydrogenated oil is a vegetable oil predominantly consisting of triglycerides of saturated and unsaturated C16–C22 fatty acids.

7. A vegetable oil fraction obtainable by the process according to claim 5, said fraction being enriched in non-tocolic, high-melting, unsaponifiable matter by a factor of at least 3 and having a trans-fatty acid content of maximum 2% by weight.

8. A vegetable oil fraction according to claim 7, wherein the unsaponifiable matter is comprised of or derived from carotenoids; sesamin and sesamolin; γ-oryzanol; sterols, methyl sterols and dimethyl sterols; triterpene alcohols and their esters with cinnamic acid, acetic acid and fatty acids; or mixtures thereof.

9. A vegetable oil fraction obtained by the process according to claim 5, said fraction being enriched in non-tocolic, high-melting, unsaponifiable matter by a factor of at least 3.

10. A process according to claim 1, wherein the starting oil containing the unsaponifiable matter is interesterified before the hydrogenation step in order to increase the oil solubility of a part of the unsaponifiable material.

11. A process according to claim 10, wherein the interesterification is performed for at least 5 minutes in the presence of a suitable catalyst.

12. A process according to claim 11, wherein the catalyst is selected from the group consisting of methoxide, ethoxide, and a mixture of glycerol and caustic lye.

13. A vegetable oil fraction obtainable by the process according to claim 11, said fraction being enriched in non-tocolic, high-melting, unsaponifiable matter by a factor of at least 3 and having a trans-fatty acid content of maximum 2% by weight.

14. A vegetable oil fraction according to claim 13, wherein the unsaponifiable matter is comprised of or derived from carotenoids; sesamin and sesamolin; γ-oryzanol; sterols, methyl sterols and dimethyl sterols; triterpene alcohols and their esters with cinnamic acid, acetic acid and fatty acids; or mixtures thereof.

15. A shea butter fraction obtainable by the process according to claim 10 having a content of at least 30% by weight of non-tocolic, high-melting, unsaponifiable matter and being further characterized by containing hydrogenated triterpene alcohols and/or their esters and by having a trans-fatty acid content of maximum 2% by weight.

16. A shea butter fraction according to claim 15 having a content of 40–90% by weight of said unsaponifiable matter.

17. A method of preparing nutritional supplements, which comprises:
adding a shea butter fraction according to claim 15 as an ingredient in nutritional supplements.

18. A method for preparing a medicament for lowering blood cholestrol level which comprises adding a shea butter fraction according to claim 15 as an ingredient in a medicament for lowering blood cholestrol level.

19. A process according to claim 1, wherein the oil mixture from step b) is interesterified before the fractionation steps c) and d) in order to randomize the fatty acid content and incorporate unsaturated fatty acid in a glyceridic part of the resulting enriched oil fraction.

20. A process according to claim 19, wherein the interesterification is performed for at least 5 minutes in the presence of a suitable catalyst.

21. A process according to claim 20, wherein the catalyst is selected from the group consisting of methoxide, ethoxide, and a mixture of glycerol and caustic lye.

22. A vegetable oil fraction obtainable by the process according to claim 19, said fraction being enriched in non-tocolic, high-melting, unsaponifiable matter by a factor of at least 3 and having a trans-fatty acid content of maximum 2% by weight.

23. A vegetable oil fraction according to claim 22, wherein the unsaponifiable matter is comprised of or derived from carotenoids; sesamin and sesamolin; γ-oryzanol; sterols, methyl sterols and dimethyl sterols; triterpene alcohols and their esters with cinnamic acid, acetic acid and fatty acids; or mixtures thereof.

24. A shea butter fraction obtainable by the process according to claim 19 having a content of at least 30% by weight of non-tocolic, high-melting, unsaponifiable matter and being further characterized by containing hydrogenated triterpene alcohols and/or their esters and by having a trans-fatty acid content of maximum 2% by weight.

25. A shea butter fraction according to claim 24 having a content of 40–90% by weight of said unsaponifiable matter.

26. A method of preparing nutritional supplements, which comprises:
adding a shea butter fraction according to claim 24 as an ingredient in nutritional supplements.

27. A method for preparing a medicament for lowering blood cholesterol level which comprises adding a shea butter fraction according to claim 24 as an ingredient in a medicament for lowering blood cholestrol level.

28. A process according to claim 1, wherein the solvent used in step c) is selected from the group consisting of non-polar and semi-polar solvents.

29. A process according to claim 28, wherein the solvent is selected from the group consisting of hydrocarbons and linear and branched alkanols of 1–5 carbon atoms.

30. The process according to claim 28, wherein the solvent is hexane or petroleum ether.

31. A process according to claim 1, wherein the starting vegetable oil containing the unsaponifiable matter is an oil from rapeseed, canola, soybean, corn, maize-germ, sunflower, flax (low-linolenic linseed), mango, avocado, olive, sesame, rice bran, wheat germ, oat and oat bran, palm, sal, shorea, illipe, shea, hybrids thereof and any fraction and mixtures thereof.

32. A process according to claim 1, wherein the starting vegetable oil is a dekaritenized fraction of shea butter having a slip melting point of a maximum of 30° C. that is enriched in unsaponifiable matter obtained by deacidifying crude shea butter, mixing the deacidified product with a semi-polar solvent to precipitate a major part of karitene (polyisoprenic hydrocarbons), separating karitene precipitant from the product, distilling the semi-polar solvent from the product, mixing the remaining shea oil product with a non-polar or semi-polar solvent at a ratio of about 1:2 to about 1:4, heating the resulting mixture to transparency, cooling the mixture to a temperature that causes high melting glycerides to precipitate; separating the glyceride precipitant from remaining mixture, and distilling the solvent from the product to obtain the dekaritenized fraction of shea butter having a slip melting point of a maximum of 30° C. suitable for further processing.

33. The process of claim 32, wherein the solvent is hexane.

34. A process according to claim 1, wherein the desolventized vegetable oil fraction obtained is further subjected to concentration by means of supercritical fluid extraction, molecular distillation, chromatography or recrystallization.

35. A process according to claim 1, wherein the desolventized vegetable oil fraction obtained is further subjected to chemical modification, selected from the group consisting of hydrogenation, ethoxylation, propoxylation, esterification and interesterification.

36. A process according to claim 1, wherein the physical state of the desolventized vegetable oil fraction obtained is further treated by emulsification, incorporation in liposomes or nanosomes, admixing with a high-melting fat and spray cooling, or microencapsulation.

37. A shea butter fraction obtainable by the process according to claim 1 having a content of at least 30% by weight of non-tocolic, high-melting, unsaponifiable matter and being further characterized by containing hydrogenated triterpene alcohols and/or their esters and by having a trans-fatty acid content of maximum 2% by weight.

38. A shea butter fraction according to claim 37 having a content of 40–90% by weight of said unsaponifiable matter.

39. A method of preparing nutritional supplements, which comprises:
    adding a shea butter fraction according to claim 37 as an ingredient in nutritional supplements.

40. A method of preparing a medicament for lowering blood cholesterol level, which comprises:
    adding a shea butter fraction according to claim 37 as an ingredient in a medicament for lowering blood cholesterol level.

41. A vegetable oil fraction obtained by the process of claim 1.

42. A method of fortifying food products, which comprises:
    adding a vegetable oil fraction according to claim 41 to a food product.

43. The method according to claim 42, wherein the food product is a dairy or dairy-like food product selected from the group consisting of milk, cream, ice cream, butter, cheese, yogurt and other fermented milk products.

44. The method according to claim 42, wherein the food product is selected from the group consisting of margarine, butter, margarine-butter blends, oil containing spreads, mayonnaise, shortening, dressings and salad oils at a concentration of 2–50% by weight.

45. A method of preparing cosmetics, pharmaceuticals or pseudopharmaceutical products for topical application, which comprises:
    adding a vegetable oil fraction according to claim 41 as an ingredient in cosmetics, pharmaceuticals or pseudopharmaceutical products for topical application.

46. A method of preparing nutritional supplements, which comprises:
    adding a vegetable oil fraction according to claim 9 as an ingredient in nutritional supplements.

* * * * *